(12) United States Patent
Kong et al.

(10) Patent No.: US 10,622,652 B2
(45) Date of Patent: Apr. 14, 2020

(54) FUEL CELL SYSTEM AND CONTROL METHOD THEREFOR

(71) Applicant: LG CHEM, LTD., Seoul (KR)

(72) Inventors: Chang Sun Kong, Daejeon (KR); Jae Choon Yang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 97 days.

(21) Appl. No.: 15/765,909

(22) PCT Filed: Oct. 31, 2016

(86) PCT No.: PCT/KR2016/012355
§ 371 (c)(1),
(2) Date: Apr. 4, 2018

(87) PCT Pub. No.: WO2017/074153
PCT Pub. Date: May 4, 2017

(65) Prior Publication Data
US 2018/0301724 A1    Oct. 18, 2018

(30) Foreign Application Priority Data

Oct. 30, 2015  (KR) .......... 10-2015-0152544
Oct. 31, 2016  (KR) .......... 10-2016-0142673

(51) Int. Cl.
*H01M 8/04992*     (2016.01)
*H01M 8/0432*      (2016.01)
(Continued)

(52) U.S. Cl.
CPC ....... *H01M 8/04992* (2013.01); *H01M 8/045* (2013.01); *H01M 8/0488* (2013.01);
(Continued)

(58) Field of Classification Search
CPC .......... H01M 2250/20; H01M 8/0488
See application file for complete search history.

(56) References Cited

U.S. PATENT DOCUMENTS 6,428,918 B1 *  8/2002  Fuglevand  ........ H01M 8/04007
429/431

FOREIGN PATENT DOCUMENTS

JP    2004-296374 A    10/2004
JP    2005-142018 A    6/2005
(Continued)

OTHER PUBLICATIONS

International Search Report issued in PCT/KR2016/012355 (PCT/ISA/210), dated Jan. 31, 2017.

*Primary Examiner* — Olatunji A Godo
(74) *Attorney, Agent, or Firm* — Birch, Stewart, Kolasch & Birch, LLP

(57) ABSTRACT

The present invention relates to a fuel cell system and a control method therefor. An aspect of the present invention provides a fuel cell system comprising: a fuel cell stack; a memory unit in which a plurality of current-voltage curves, which are determined according to operation conditions of the fuel cell stack, are stored; a measurement unit for detecting an operation condition of the fuel cell stack; and a control unit for calling a current-voltage curve which satisfies the operation condition of the fuel cell stack, detected by the measurement unit, and predicting the performance of the fuel cell stack according to the called current-voltage curve.

14 Claims, 6 Drawing Sheets

(51) Int. Cl.
    *H01M 8/04492*     (2016.01)
    *H01M 8/0438*     (2016.01)
    *H01M 8/04701*     (2016.01)
    *H01M 8/04746*     (2016.01)
    *H01M 8/04858*     (2016.01)
    *H01M 8/04537*     (2016.01)
    *H01M 8/04828*     (2016.01)

(52) U.S. Cl.
    CPC ..... *H01M 8/0491* (2013.01); *H01M 8/04328* (2013.01); *H01M 8/04335* (2013.01); *H01M 8/04388* (2013.01); *H01M 8/04395* (2013.01); *H01M 8/04507* (2013.01); *H01M 8/04559* (2013.01); *H01M 8/04589* (2013.01); *H01M 8/04701* (2013.01); *H01M 8/04746* (2013.01); *H01M 8/04828* (2013.01)

(56) References Cited

FOREIGN PATENT DOCUMENTS

| | | |
|---|---|---|
| JP | 2008-66120 A | 3/2008 |
| JP | 2009-181810 A | 8/2009 |
| KR | 10-2012-0060505 A | 6/2012 |

\* cited by examiner

[Figure 1]
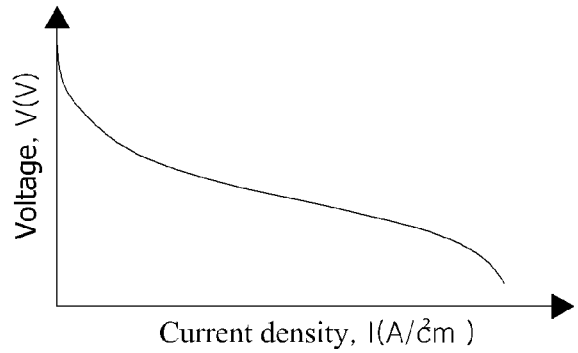
[Figure 2]
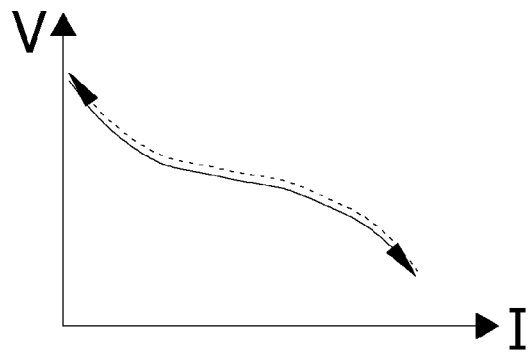
[Figure 3]
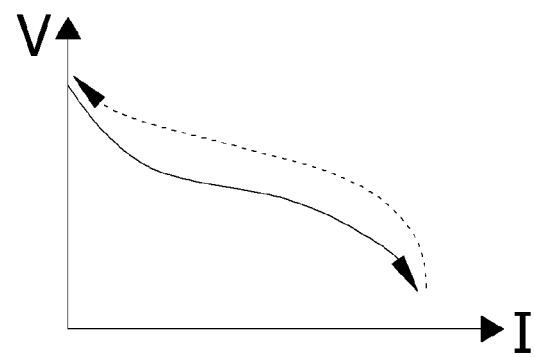

[Figure 4]
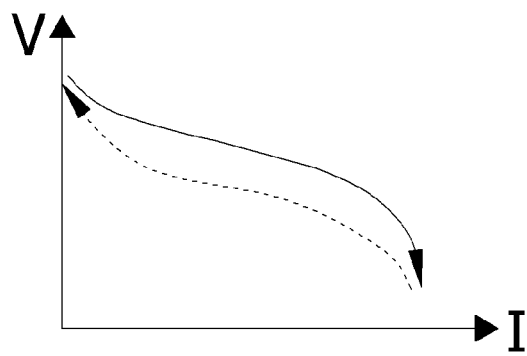
[Figure 5]
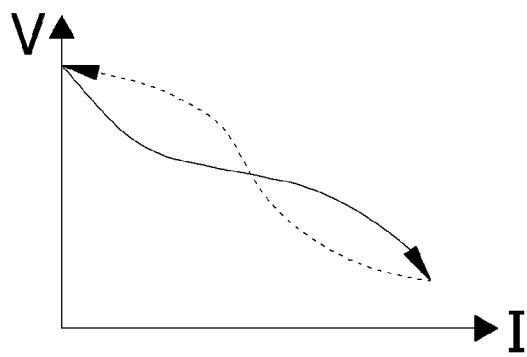
[Figure 6]
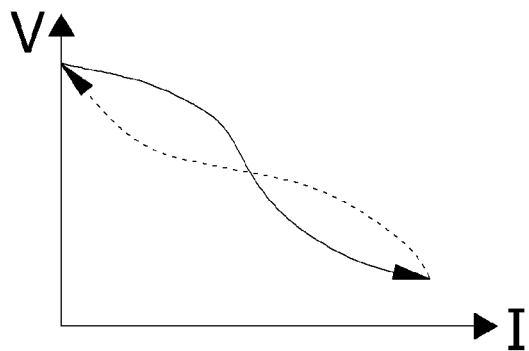

[Figure 7]
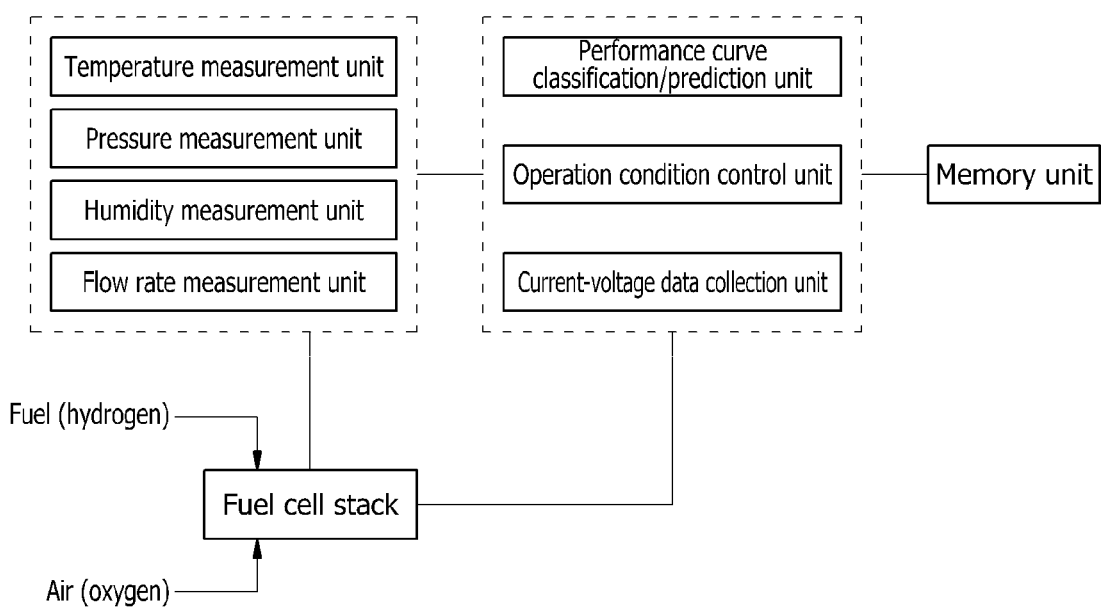
[Figure 8]
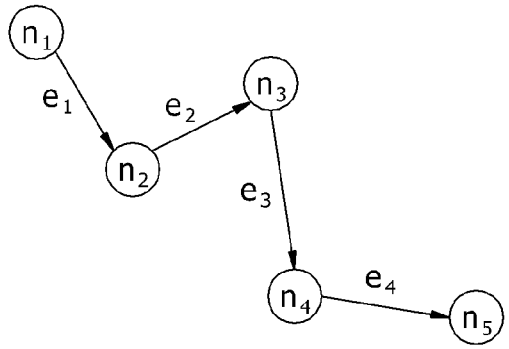

[Figure 9]
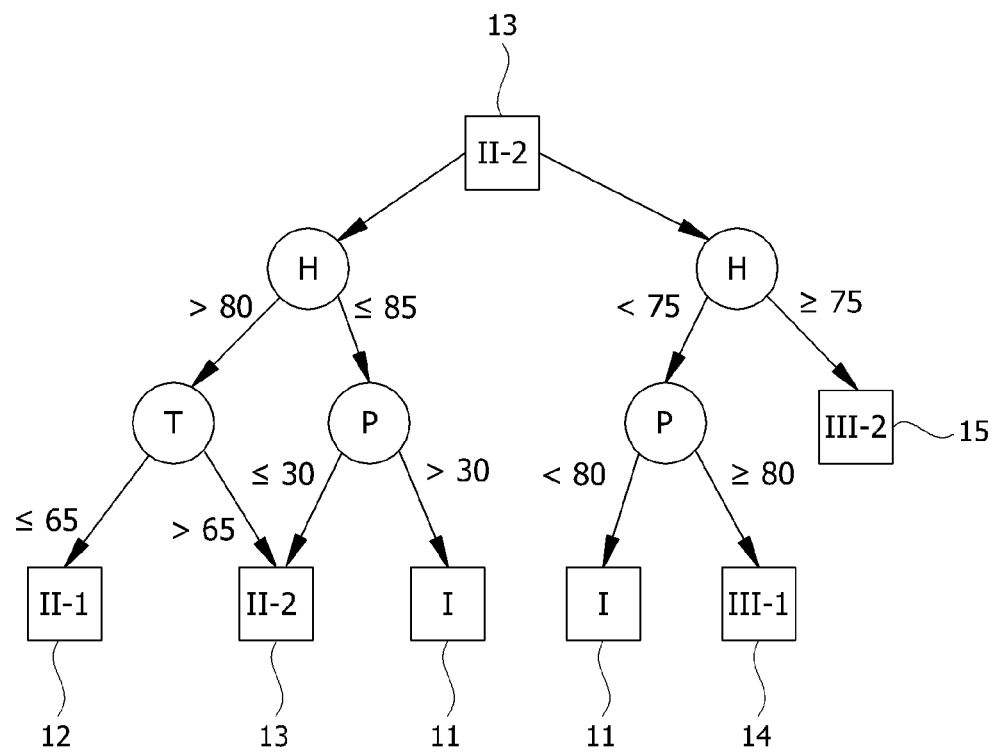

[Figure 10]
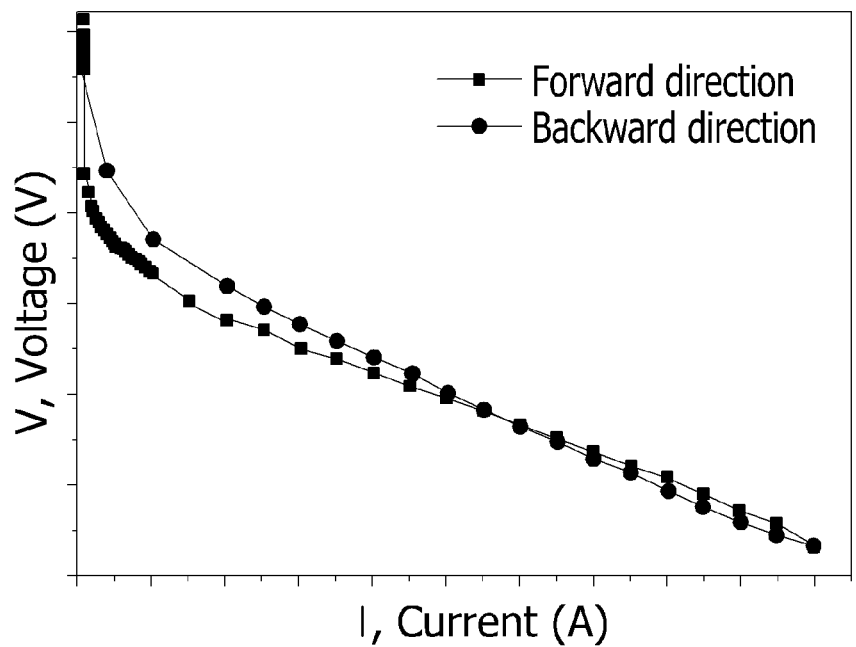
[Figure 11]
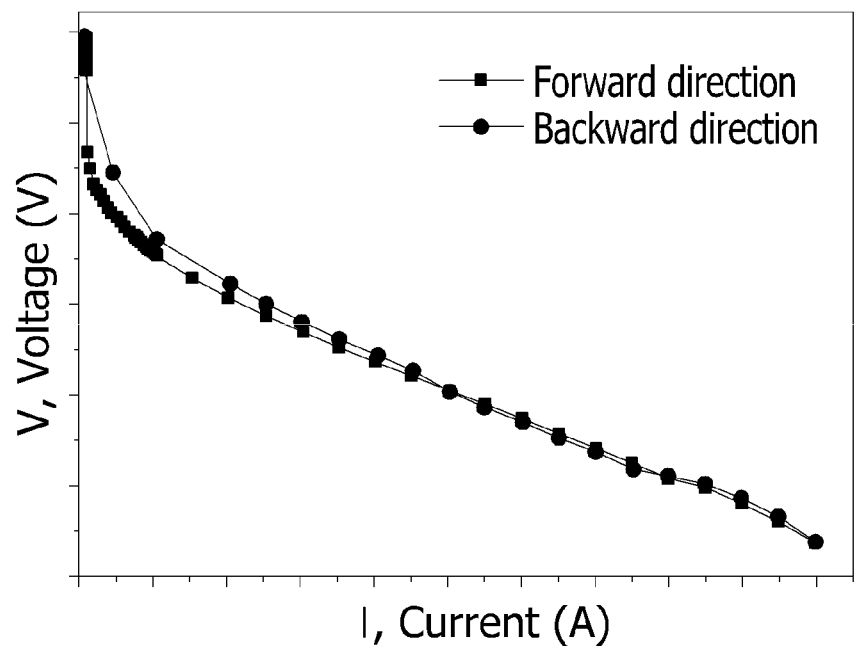

[Figure 12]
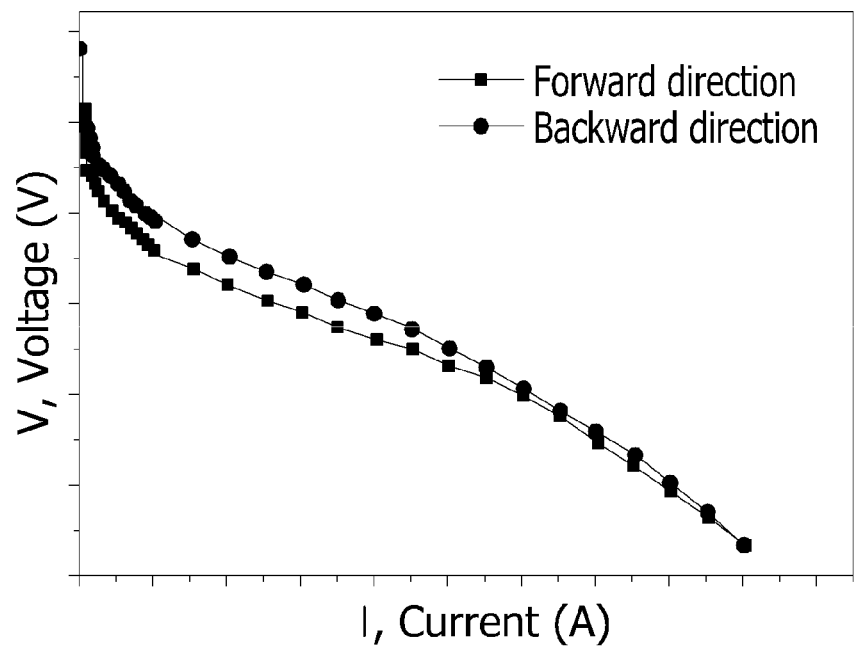

FUEL CELL SYSTEM AND CONTROL METHOD THEREFOR

TECHNICAL FIELD

The present invention relates to a fuel cell system and a control method therefor.

The present application claims the benefit of priority based on Korean Patent Application No. 10-2015-0152544 dated Oct. 30, 2015, and Korean Patent Application No. 10-2016-0142673 dated Oct. 31, 2016, the disclosures of which are incorporated herein by reference in their entireties.

BACKGROUND ART

Generally, a fuel cell is an energy conversion device that generates electrical energy through an electrochemical reaction between a fuel and an oxidizer and has an advantage that electric power can be consistently generated as long as the fuel is continuously supplied.

For example, a polymer electrolyte membrane fuel cell (PEMFC), which uses a polymer membrane as an electrolyte capable of permeating hydrogen ions, has a low operating temperature of about 100° C. as compared to other types of fuel cells, and has advantages of high energy conversion efficiency, high output density and fast response characteristics. Besides, since it can be miniaturized, it can be provided as portable, vehicle and household power supplies.

Specifically, the polymer electrolyte membrane fuel cell stack comprises a membrane-electrode assembly (MEA) having an electrode layer formed by applying an anode and a cathode, respectively, around an electrolyte membrane composed of a polymer material, a gas diffusion layer (GDL) for serving to distribute reaction gases evenly and to transfer the generated electric energy, a separating plate (bipolar plate) for supplying reaction gases to the gas diffusion layer and discharging the generated water, and a gasket for preventing leakage of the reaction gases and the cooling water between the membrane-electrode assembly and the separating plate.

FIG. 1 shows a current versus voltage curve of a fuel cell system.

Referring to FIG. 1, a current (I) versus voltage (V) curve of a fuel cell called a polarization curve or performance curve is a representative analysis and expression method for indicating the performance of the fuel cell as data measuring the output current density generated by the fuel cell system under specific operation conditions.

However, such a single characteristic curve shows only limited information on the electrochemical response characteristics and performance changes of the fuel cell to the instantaneous load changes, and an additional diagnostic and analytical technique to be supplemented as a means for determining the dynamic performance change of the fuel cell under the changing operation conditions and the internal state of the operating fuel cell is required.

That is, when the current density changes either from a low state to a high state (forward direction) or from a high state to a low state (backward direction), a hysteresis showing different trajectories appears, but there is a problem that the single current-voltage curve does not include any information on this phenomenon.

DISCLOSURE

Technical Problem

It is an object of the present invention to provide a fuel cell system which analyzes electrochemical response characteristics during dynamic load change of a fuel cell system to be evaluated through a classification method based on a topological pattern of a cyclic polarization curve of the fuel cell, thereby enabling performance evaluation of the fuel cell under dynamic conditions, optimization of operation conditions and internal state diagnosis of the fuel cell, and a control method therefor.

Technical Solution

To attain the above-described object, according to one aspect of the present invention, there is provided a fuel cell system comprising a fuel cell stack; a memory unit storing a plurality of current-voltage curves determined according to operation conditions of the fuel cell stack; a measurement unit for sensing the operation condition of the fuel cell stack; and a control unit for calling a current-voltage curve which satisfies the operation condition of the fuel cell stack, sensed by the measurement unit, and predicting the performance of the fuel cell stack according to the called current-voltage curve.

Here, the control unit is provided to call a current-voltage curve having high similarity according to the graph theory based on the operation conditions of the fuel cell stack collected through the measurement unit.

Furthermore, the plurality of current-voltage curves may comprise at least one curve that a forward trajectory and a backward trajectory show hysteresis phenomena.

Also, the plurality of current-voltage curves may comprise a curve that a forward trajectory and a backward trajectory show hysteresis phenomena and both trajectories have one or more intersection points.

In addition, the measurement unit may comprise at least one of a temperature sensor, a pressure sensor, a humidity sensor, and a flow rate sensor.

Furthermore, the control unit may be provided to collect the operation conditions of the fuel cell stack in real time through the measurement unit.

Also, the control unit may be provided to control at least one of temperature, pressure, humidity, or flow rate according to the called current-voltage curve.

In addition, the control unit may be provided to control the current and the voltage according to the called current-voltage curve.

Furthermore, the control unit may be provided to collect current and voltage data of the fuel cell stack.

Also, the control unit may be provided such that the measured current and voltage data are matched with the collected operation conditions of the fuel cell to store them together. Specifically, during operation, each of the collection of the current and voltage data of the fuel cell stack and the collection of the operation conditions of the fuel cell can be performed individually, and these individual data can be matched to each other and stored together. That is, the operation conditions of the fuel cell stack in specific current-voltage data can be matched and stored in a table manner.

Furthermore, the operation condition of the fuel cell stack may be at least one of an inflow concentration of a reaction gas, a pressure of a reaction gas, a humidity of a reaction gas, or a cell temperature.

Also, the performance of the fuel cell stack may be a current density produced under a certain voltage condition.

In addition, the control unit may be provided to monitor the performance of the fuel cell stack in real time.

Furthermore, the control unit may be provided to generate an operation control rule of the fuel cell stack for classifying the current-voltage curves according to the operation conditions of the fuel cell stack. In addition, the control unit may be provided to evaluate the generated operation control rule.

Also, in the process of predicting the performance of the fuel cell stack based on any one of the called current-voltage curves (for example, a first current-voltage curve), the control unit may be provided to call another current-voltage curve (for example, a second current-voltage curve) according to the operation control rule, when the operation condition of the fuel cell stack changes. Then, the control unit may be provided to predict the performance of the fuel cell stack based on the second current-voltage curve.

According to another aspect of the present invention, there is also provided a method for controlling a fuel cell system comprising steps of storing a plurality of current-voltage curves determined according to operation conditions of a fuel cell stack, sensing the operation condition of the fuel cell stack; and calling a current-voltage curve which satisfies the sensed operation condition of the fuel cell stack and predicting the performance of the fuel cell stack according to the called current-voltage curve. Here, the control unit is provided to call a current-voltage curve having high similarity based on the graph theory according to the operation conditions of the fuel cell stack collected through the measurement unit.

Furthermore, the plurality of current-voltage curves may comprise at least one curve that a forward trajectory and a backward trajectory show hysteresis phenomena.

Also, the plurality of current-voltage curves may comprise a curve that a forward trajectory and a backward trajectory show hysteresis phenomena and both trajectories have one or more intersection points.

Furthermore, the operating condition of the fuel cell stack may be measured through at least one of a temperature sensor, a pressure sensor, a humidity sensor, or a flow rate sensor.

In addition, the control method of the fuel cell system may further comprise a step of controlling at least one of temperature, pressure, humidity or flow rate according to the called current-voltage curve.

Also, the control method of the fuel cell system may further comprise a step of controlling the current and the voltage of the fuel cell stack according to the called current-voltage curve.

In addition, the control method of the fuel cell system may further comprise a step of collecting current and voltage data of the fuel cell stack.

Furthermore, the operation condition of the fuel cell may be at least one of an inflow concentration of a reaction gas, a pressure of a reaction gas, a humidity of a reaction gas, or a cell temperature.

Also, the performance of the fuel cell stack may be a current density produced under a certain voltage condition.

Advantageous Effects

As described above, the fuel cell system related to one embodiment of the present invention, and the control method therefor have the following effects.

The hysteresis phenomena occurring in the trajectories of the current-voltage curves obtained by the forward and backward scans according to the operation conditions of the fuel cell stack can be classified into a finite number of basic types depending on to the types thereof.

In addition, the operating parameters such as the inflow concentration of the reaction gas, the relative humidity of the reaction gas, the cell temperature and the pressure, and the characteristics of the fuel cell stack components such as the characteristics of the catalyst layer, the gas diffusion layer and the electrode, and the performance of the polymer electrolyte membrane can be utilized in predicting the instantaneous performance of the fuel cell, optimizing the operation condition, and designing the fuel cell, and the like through the classification method using correlation between hysteresis curve types.

BRIEF DESCRIPTION OF DRAWINGS

FIG. 1 shows a current versus voltage curve of a fuel cell system.

FIGS. 2 to 6 are graphs showing various types of current versus voltage curves.

FIG. 7 is a configuration diagram of the fuel cell system related to one embodiment of the present invention.

FIG. 8 is a conceptual diagram for explaining the graph theory for current-voltage curve classification.

FIG. 9 is a conceptual diagram for explaining an operation control rule.

FIGS. 10 to 12 are graphs for explaining one control state of the fuel cell system related to the present invention.

MODE FOR INVENTION

Hereinafter, a fuel cell system according to one embodiment of the present invention and a control method therefor will be described in detail with reference to the accompanying drawings.

In addition, the same or similar reference numerals are given to the same or corresponding components regardless of reference numerals, of which redundant explanations will be omitted, and for convenience of explanation, the size and shape of each constituent member as shown may be exaggerated or reduced.

FIGS. 2 to 6 are graphs showing various types of current versus voltage curves, and FIG. 7 is a configuration diagram of the fuel cell system related to one embodiment of the present invention.

Furthermore, FIG. 8 is a conceptual diagram for explaining the graph theory for current-voltage curve classification, and FIG. 9 is a conceptual diagram for explaining operation control rules. Referring to FIG. 7, the fuel cell system (1) comprises a fuel cell stack (10). As described above, the fuel cell stack (10) may comprise a membrane-electrode assembly (MEA) having an electrode layer formed by applying an anode and a cathode, respectively, around an electrolyte membrane composed of a polymer material, a gas diffusion layer (GDL) for serving to distribute reaction gases evenly and to transfer the generated electric energy, a separating plate (bipolar plate) for supplying reaction gases to the gas diffusion layer and discharging the generated water, and the like.

The fuel cell system (1) comprises a memory unit (40) storing a plurality of current-voltage curves determined according to operation conditions of the fuel cell stack (10), and a measurement unit (20) for sensing the operation condition of the fuel cell stack (10).

The memory unit (40) stores a plurality of current-voltage curves that is determined as the operation condition of the fuel cell stack (10) is changed. The plurality of current-voltage curves is the performance curve of the above-described fuel cell system, and has different characteristics.

On the other hand, the current density (I) generated under a specific cell voltage condition (V) can be determined according to the operation conditions of the fuel cell stack (10) (inflow concentration, pressure and humidity of the reaction gas, cell temperature, humidity, etc.) and the performances of the components in the fuel cell stack (10) (ionic and electrical conductivity and gas permeation characteristics of the electrolyte membrane, electrochemical performance of the electrode composed of the catalyst layer and the gas diffusion layer, and moisture discharge characteristics, and the like).

The performance curve indicating the continuously changing behavior of the current-voltage in a specific fuel cell system (1) shows a hysteresis phenomenon that represents, upon shifting from any one current-voltage condition to another current-voltage condition in a non-equilibrium state, different trajectories according to the direction of travel, which can be classified into the following finite number of types.

Referring to FIG. 2, the I-V curve shows the current-voltage change behavior under the continuous equilibrium state, where the trajectories of the current-voltage curve upon forward and backward changes match. This type of curve does not include information on the performance change of the fuel cell stack (10) under a sudden dynamic operation condition.

The plurality of current-voltage curves may comprise at least one curve that a forward trajectory and a backward trajectory show hysteresis phenomena.

Referring to FIGS. 3 and 4, the I-V curve is a form in which the performance upon the backward change with respect to the forward change appears higher (FIG. 3) or lower (FIG. 4) in the entire current density region. For example, when excess water generated in the high current density region is accumulated inside the fuel cell system to consistently decrease the distribution of the reaction gas, the hysteresis phenomenon as in FIG. 4 may appear. Conversely, when the water content generated during the reaction is optimized to the operation and system conditions that improve the ionic conductivity of the electrolyte membrane while minimizing the effect on the distribution of the reaction gas, the pattern of FIG. 3, which results in a higher backward performance than the forward performance, may appear.

Furthermore, the plurality of current-voltage curves may comprise a curve that a forward trajectory and a backward trajectory show hysteresis phenomena and both trajectories have one or more intersection points.

Referring to FIGS. 5 and 6, the trajectories of the forward and backward performance curves comprise an intersection point, and an inversion phenomenon of the forward and backward performances occurs at the current density region higher or lower than this intersection point. For example, the backward performance appears lower than the forward performance due to the overflow phenomenon (hereinafter, referred to as 'flooding') of water accumulated inside the system in the high current density region, and then as the trajectory goes to the low current density region, the performance inversion phenomenon occurs, in which the performance is improved while the accumulated amount of water decreases (see FIG. 5). Conversely, the pattern as in FIG. 6 may appear when the contribution of the moisture content on the performance, which is due to the improvement of the ionic conductivity of the electrolyte membrane in the high current density region, decreases and other deteriorating factors (for example, catalyst loss, poisoning, electrolyte membrane drying, etc.) contribute predominantly to the performance in the low current density region.

Besides, hysteresis phenomena having a form that two or more of the above-described types are combined may appear, and the plurality of current-voltage curves described hereby is not limited to only the performance curves of the above-described five basic types.

The hysteresis phenomenon shown by such a cyclic current-voltage curve further provides information that the conventional performance curve does not have, as shown in FIG. 2, which can be applied to fields such as real-time performance monitoring and prediction of instantaneous performance during operation of the fuel cell system (1), optimization of operation conditions, and design of a fuel cell system (1).

The fuel cell system (1) also comprises a control unit (30) for calling a current-voltage curve which satisfies the operation condition of the fuel cell stack (10), sensed by the measurement unit (20), and predicting the performance of the fuel cell stack (10) according to the called current-voltage curve.

Here, the control unit (30) is provided to call a current-voltage curve having high similarity based on the graph theory according to the operation conditions of the fuel cell stack (10) collected through the measurement unit (20). Specifically, it is necessary to define the relationship between various operation conditions of the fuel cell stack (10) and finite number of current-voltage curve patterns. For example, the control unit (30) is provided to classify such a behavior into five current-voltage curve types (FIGS. 2 to 6) even in various operation conditions of the fuel cell stack (10).

Referring to FIG. 8 with regard to the graph theory, the current-voltage states at a specific instant in a current-voltage (I-V) two-dimensional plane can be represented by nodes (n1 to n5), and edges (e1 to e4) between the nodes can be indicated by arrows in accordance with the current-voltage change directions. The curve representing the current-voltage changes can be represented by a graph composed of nodes and edges. At this time, if the graphs composed of nodes and edges are classified according to topological patterns, they can be classified into finite number of current-voltage curve types shown in FIGS. 2 to 6.

Furthermore, based on the current-voltage data, an adjacency matrix and an incidence matrix are generated, whereby the similarity may be measured.

In addition, the measurement unit (20) may comprise at least one of a temperature sensor, a pressure sensor, a humidity sensor, and a flow rate sensor. The measurement unit (20) may comprise a temperature measurement unit (21), a pressure measurement unit (22), a humidity measurement unit (23), and a flow rate measurement unit (24).

The control unit (30) may comprise a performance curve classification/prediction unit (31), an operation condition control unit (32), and a current-voltage data collection unit (33). In addition, the control unit (30) may be provided to collect current and voltage data of the fuel cell stack. The control unit (30) can confirm through the collection of the current and voltage data of the fuel cell stack whether or not the hysteresis phenomenon has occurred as compared to the reference performance curve (FIG. 2), and classify and call the current-voltage curve which satisfies the operation condition of the current fuel cell stack (10). Furthermore, as described above, the performance curve classification/prediction unit (31) is provided to call a current-voltage curve having high similarity according to the graph theory.

In addition, the classification of the current-voltage performance curve types can be classified by measuring the similarity between two graphs, and various types of similarity measurement methods can be applied thereto.

The control unit (30) may be provided such that the measured current and voltage data are matched with the collected operation conditions of the fuel cell to store them in the memory unit (40) together. Also, the collection of the operation conditions of the fuel cell stack (10) may be performed through the measurement unit (20) and the collection of the current and voltage data of the fuel cell stack (10) may be performed through the current-voltage data collection unit (33). Specifically, during operation, each of the collection of the current and voltage data of the fuel cell stack (10) and the collection of the operation conditions of the fuel cell stack (10) can be performed individually, and these individual data can be matched to each other and stored together. That is, the operation conditions of the fuel cell stack (10) in the specific current-voltage data can be matched and stored in a table manner. In addition, the control unit (30) may be provided to collect the operation conditions of the fuel cell stack in real time through the measurement unit (20).

Here, the control unit (30) may be provided to control at least one of temperature, pressure, humidity, and flow rate according to the called current-voltage curve.

Also, the control unit (30) may be provided to control the current and the voltage of the fuel cell stack (10) according to the called current-voltage curve.

In addition, the operation condition of the fuel cell stack (10) may be at least one of the inflow concentration of the reaction gas, the pressure of the reaction gas, the humidity of the reaction gas, or the cell temperature.

On the other hand, the performance of the fuel cell stack (10) may be a current density generated under a certain voltage condition.

In addition, the control unit may be provided to monitor the performance of the fuel cell stack (10) in real time.

Referring to FIG. 9, the operation condition control unit (32) can generate the operation control rule of the fuel cell stack (10) in the following manner.

In FIG. 9, reference numerals 11 to 15 represent the current-voltage curves as described through in FIGS. 2 to 6, respectively. In addition, H represents humidity, T represents temperature, and P represents pressure. Specifically, when the temperature, the humidity, and the pressure change, a current-voltage curve having a type different from the previously called current-voltage curve is called, and the fuel cell stack (10) is controlled based on the newly called current-voltage curve. That is, it may be defined as the operation control rule that the current-voltage curve type is changed based on the change in the operation condition of the fuel cell stack (10), such as temperature, humidity, pressure, and the like.

The control unit (30) may be provided to generate an operation control rule of the fuel cell stack for classifying the current-voltage curve according to the operation conditions of the fuel cell stack (10). In addition, the control unit (30) may be provided to evaluate the generated operation control rule. Accordingly, the control unit (30) may be provided to learn data of operation control rules (e.g., if-then rules), and may perform an artificial intelligent control.

In addition, when the operation control rule is generated, a decision tree (see FIG. 9) may also be used in connection with the pattern recognition algorithm, and a support vector machine, a principal component analysis, a cluster analysis and the like can be used.

Furthermore, in the process of predicting the performance of the fuel cell stack based on any one of the called current-voltage curves (for example, the first current-voltage curve), when the operation condition of the fuel cell stack (10) is changed, the control unit (30) may be provided to call another current-voltage curve (for example, the second current-voltage curve) in accordance with the operation control rule. Thereafter, the control unit (30) may be provided to predict the performance of the fuel cell stack (10) based on the second current-voltage curve.

For example, in connection with the evaluation and update of the operation control rules, data collected during a predetermined time interval (e.g., hi) is used to generate the control rule, where the predicted values such as the current, voltage, and output density adjusted by the control rule can be compared with the values measured during another time interval (e.g., hj). The difference (dispersion value) can be used as a reference for adjusting or improving the control rule through a feedback loop, and by being utilized for the diagnosis of the current state of the fuel cell stack, can be utilized to control so that the fuel cell stack maintains the optimal performance through the adjustment of operation condition variables (temperature, pressure, humidity, etc.). Furthermore, any one of the plurality of fuel cells may be used for the evaluation and update of the operation control rule.

The control method of the fuel cell system (1) having the above structure is as follows.

The control method of the fuel cell system related to one embodiment of the present invention comprises a step of storing a plurality of current-voltage curves determined according to operation conditions of a fuel cell stack. In addition, the control method of the fuel cell system comprises steps of sensing the operation condition of the fuel cell stack, and calling a current-voltage curve that satisfies the operation condition of the sensed fuel cell stack and predicting the performance of the fuel cell stack according to the called current-voltage curve. Here, the control unit is provided to call a current-voltage curve having high similarity based on the graph theory according to the operation condition of the fuel cell stack collected through the measurement unit.

As described above, the plurality of current-voltage curves may comprise at least one curve that a forward trajectory and a backward trajectory show hysteresis phenomena. Also, the plurality of current-voltage curves may comprise a curve that a forward trajectory and a backward trajectory show hysteresis phenomena and both trajectories have one or more intersection points.

Furthermore, the operating condition of the fuel cell stack may be measured through at least one of a temperature sensor, a pressure sensor, a humidity sensor, or a flow rate sensor.

In addition, the control method of the fuel cell system may further comprise a step of controlling at least one of temperature, pressure, humidity or flow rate according to the called current-voltage curve. Also, the control method of the fuel cell system may further comprise a step of controlling the current and the voltage of the fuel cell stack according to the called current-voltage curve. Furthermore, the control method of the fuel cell system may further comprise a step of collecting current and voltage data of the fuel cell stack.

FIGS. 10 to 12 are graphs for explaining one control state of the fuel cell system related to the present invention.

Referring to FIG. 10, it is possible to diagnose that a flooding phenomenon has occurred at a high current density, and at this time, the humidity control for lowering the relative humidity can be performed.

Referring to FIG. 11, as the flooding phenomenon is removed, the hysteresis phenomenon is reduced, and the performance improvement is observed in the low current density region. At this time, the pressure control for increasing the pressure is performed, and the performance curve changes to FIG. 12.

Referring to FIG. 12, the performance curve shown in FIG. 12 is a mixed form of the performance curves shown in FIG. 10 and FIG. 11, in which the performance enhancement and the hysteresis phenomenon are observed in the middle-low power density region by pressurization, and a voltage sudden drop phenomenon due to mass transfer resistance is observed in the high current density region.

The preferred embodiments of the present invention as described above are disclosed for illustrative purposes, which can be modified, changed and added within thought and scope of the present invention by those skilled in the art and it will be considered that such modification, change and addition fall within the following claims.

INDUSTRIAL APPLICABILITY

According to the present invention, the operating parameters such as the inflow concentration of the reaction gas, the relative humidity of the reaction gas, the cell temperature and the pressure, and the characteristics of the fuel cell stack components such as the characteristics of the catalyst layer, the gas diffusion layer and the electrode, and the performance of the polymer electrolyte membrane can be utilized in predicting the instantaneous performance of the fuel cell, optimizing the operation condition, and designing the fuel cell, and the like through the classification method using the correlation between hysteresis curve types.

The invention claimed is:

1. A fuel cell system, comprising
a fuel cell stack comprising a membrane-electrode assembly (MEA), a gas diffusion layer (GDL), and a separating plate;
a memory unit storing a plurality of current-voltage curves determined according to operation conditions of the fuel cell stack;
a measurement unit for sensing an operation condition of the fuel cell stack; and
a control unit configured to:
call a first current-voltage curve among the plurality of current-voltage curves which satisfies the operation condition of the fuel cell stack, sensed by the measurement unit,
monitor performance of the fuel stack in real time,
predict the performance of the fuel cell stack according to the called first current-voltage curve, based on the sensed operation condition, and
control the current and voltage of the fuel cell stack according to the called first current-voltage curve,
wherein the plurality of current-voltage curves comprises different operation conditions from one another,
wherein a second current-voltage curve among the plurality of current-voltage curves comprises at a forward trajectory and a backward trajectory showing a hysteresis phenomena,
wherein a third current-voltage curve among the plurality of current-voltage curves comprises a backward performance lower than a forward performance due to an overflow of water accumulated inside a high density region of the fuel cell stack, and
wherein the operation conditions of the fuel cell stack include at least one of the following: an inflow concentration of a reaction gas, a pressure of a reaction gas, a humidity of a reaction gas, or a cell temperature.

2. The fuel cell system according to claim 1,
wherein at least one of the plurality of current-voltage curves has a forward trajectory and a backward trajectory showing a hysteresis phenomena and both trajectories having one or more intersection points.
3. The fuel cell system according to claim 1,
wherein said measurement unit comprises at least one of a temperature sensor, a pressure sensor, a humidity sensor or a flow rate sensor.
4. The fuel cell system according to claim 3,
wherein the control unit is provided to collect operation conditions of the fuel cell stack in real time through the measurement unit.
5. The fuel cell system according to claim 3,
wherein said control unit is further provided to control at least one of temperature, pressure, humidity, or flow rate according to the called first current-voltage curve.
6. The fuel cell system according to claim 1,
wherein said control unit is provided to receive current and voltage data of the fuel cell stack via the measurement unit.
7. The fuel cell system according to claim 6,
wherein said control unit matches the measured current and voltage data with the collected operation conditions of the fuel cell and stores them together.
8. The fuel cell system according to claim 1,
wherein the performance of the fuel cell stack is a current density generated under a specific voltage condition.
9. The fuel cell system according to claim 1,
wherein the control unit is provided to generate an operation control rule of the fuel cell stack for classifying the plurality of current-voltage curves according to the operation conditions of the fuel cell stack, and to evaluate the generated operation control rule.
10. The fuel cell system according to claim 9,
wherein in a process of predicting the performance of the fuel cell stack based on any one of the plurality of current-voltage curves, the control unit is provided to predict the performance of the fuel cell stack based on another one of the current-voltage curves according to the operation control rule, when the operation condition of the fuel cell stack is changed.
11. A method for controlling a fuel cell system, comprising steps of:
storing a plurality of current-voltage curves determined according to operation conditions of a fuel cell stack, wherein the fuel cell stack includes a membrane-electrode assembly (MEA), a gas diffusion layer (GDL), and a separating plate;
sensing an operation condition of the fuel cell stack;
calling a first current-voltage curve among the plurality of current-voltage curves which satisfies the sensed operation condition of the fuel cell stack;
monitoring performance of the fuel cell stack in real time;
predicting the performance of the fuel cell stack according to the called first current-voltage curve, based on the sensed operation condition; and
controlling the current and voltage of the fuel cell stack according to the called first current-voltage curve,
wherein the plurality of current-voltage curves comprises different operational conditions,
wherein a second current-voltage curve among the plurality of current-voltage curves comprises at a forward trajectory and a backward trajectory showing a hysteresis phenomena,
wherein a third current-voltage curve among the plurality of current-voltage curves comprises a backward performance lower than a forward performance due to an overflow of water accumulated inside a high density region of the fuel cell stack, and wherein the operation conditions of the fuel cell stack includes at least two of the following: an inflow concentration of a reaction gas, a pressure of a reaction gas, a humidity of a reaction gas, or a cell temperature.

12. The method according to claim 11, the predicting the performance of the fuel cell stack includes predicting the performance of the fuel cell stack based on another one of the current-voltage curves, when the operation condition of the fuel cell stack is changed.

13. The method according to claim 11, wherein at least one of the plurality of current-voltage curves has a forward trajectory and a backward trajectory showing a hysteresis phenomena and both trajectories having one or more intersection points.

14. The method according to claim 11, wherein said measurement unit comprises at least one of a temperature sensor, a pressure sensor, a humidity sensor or a flow rate sensor.

* * * * *